United States Patent [19]

Schulz

[11] Patent Number: 4,642,870

[45] Date of Patent: Feb. 17, 1987

[54] COMPOSITE PROFILE

[75] Inventor: Harald Schulz, Kammeltal, Fed. Rep. of Germany

[73] Assignee: Joseph Gartner & Co., Fed. Rep. of Germany

[21] Appl. No.: 646,689

[22] Filed: Aug. 31, 1984

[30] Foreign Application Priority Data

Sep. 9, 1983 [DE] Fed. Rep. of Germany ....... 3332618

[51] Int. Cl.[4] ........................ B21D 39/00; B23P 19/04

[52] U.S. Cl. ........................................ 29/509; 29/433

[58] Field of Search ..................... 29/509, 433; 52/730

[56] References Cited

U.S. PATENT DOCUMENTS

| | | | |
|---|---|---|---|
| 3,420,026 | 1/1969 | Nolan | 29/509 |
| 3,992,769 | 11/1976 | Jackson | 29/509 |
| 3,999,354 | 12/1976 | Anter et al. | 29/509 |
| 4,194,284 | 3/1980 | Diels et al. | 29/509 |
| 4,245,384 | 1/1981 | Egerer | 29/433 |

*Primary Examiner*—Howard N. Goldberg

*Assistant Examiner*—Steven Nichols

*Attorney, Agent, or Firm*—Jerome P. Bloom

[57] ABSTRACT

A method for producing a connection between at least one metal part having at least one longitudinally extending groove formed at one surface thereof and a thermoplastic part of plate, strip or bar configuration at least a portion of which, to be disposed in said groove, is adapted to soften or melt on the application thereto of a predetermined level of heat, wherein knurling is provided on at least a portion of the groove wall surface and heat is applied to soften or melt a portion of said thermoplastic part disposed in said groove to have at least a part of the softened or melted portion thereof serve to cap and dispose in spaces about raised and projected portions of said knurling and set thereabout to produce a fixed interconnection of said parts. Preferably there is a use of one or more contact pressure elements comprising a portion of electrolyte copper through which current is applied to produce said melting or softening of the thermoplastic part.

13 Claims, 3 Drawing Figures

COMPOSITE PROFILE

BACKGROUND OF THE INVENTION

Figure 1:
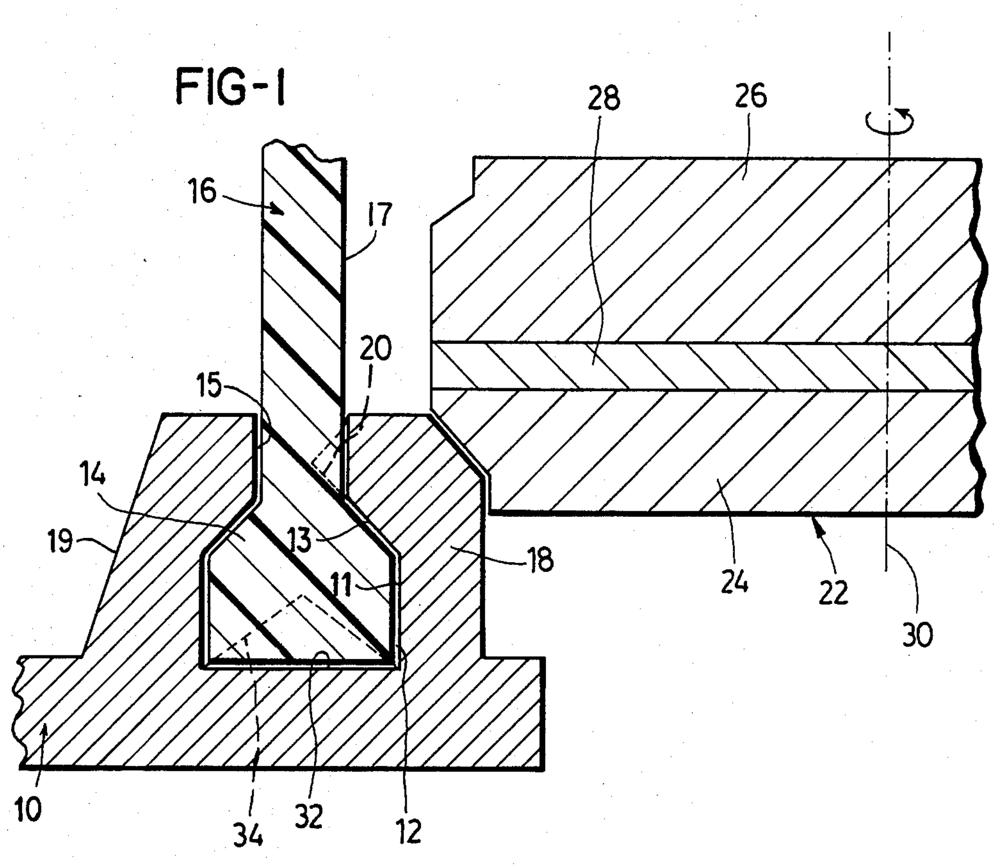

This invention relates to an improved construction and method for joining a part fabricated of metal to a part fabricated of thermo-insulating material, having a particularly advantageous application in the construction industry.

It further relates to providing a composite profile of two parts of metal joined in an improved manner by a bar, plate or strip of a relatively rigid thermo-plastic insulating material wherein the joined portion(s) of the plastic part is anchored in a groove defined in connection with, and extending longitudinally of, a metal part, the bounding wall surfaces of which groove are distinguished, at least in part, by knurling.

The invention has particular importance and significance in its application to the fabrication of frames and sashes for insulating windows and other elements of construction such as door frames. It should be understood, however, that the application of the construction and the method of the invention are not so limited.

Underlying the invention is the problem of effectively increasing the strength and reliability of the connection of parts of metal and thermo-insulating material in a composite profile and increasing in particular the shear strength between such parts.

To the extent known by those substantively involved in the present disclosure, the state of the prior art is best represented by U.S. Pat. No. 3,579,724 dated May 25, 1979, which issued in the name of Louis Toth. The structure and concept of this patent, however, does not evidence any specific pertinence to the points of novelty of the present invention.

SUMMARY OF THE INVENTION

Embodiments of the present invention comprise a metal part wherein a longitudinally extending groove formed at a surface thereof is bounded by laterally spaced sides at least one of which is defined by a leg which projects outwardly from a portion of said surface and is originally so spaced from the opposite side of the groove as to facilitate the insertion therebetween of an edge portion of a thermoinsulating material provided in a bar, strip or plate form. For convenience of description the term "bar" as hereinafter used is intended to encompass all or any one of these terms.

In the case of the construction of a window frame, sash or the like the metal profile will preferably be of aluminum and the profile bar of thermoplastic synthetic material.

In achieving one embodiment and application of the invention at least one of the side surfaces of the groove is provided with knurling, a portion of the part of thermoinsulating material within the groove is caused to have contact with the knurling and heat is applied to soften or melt this portion of the insulating material causing it to cap the raised and projected portions of the knurling and fill the space therebetween. The setting of this material produces a captive interrelation of the parts and a joint therebetween which is substantial as to its shear strength. This inhibits and precludes a relative displacement of the parts under load.

In a preferred method of fixing and holding the part of insulating material to the metal part, the insulating part is subjected to localized application of heat to produce a melting or softening of a selected portion or portions thereof. Pressure is then applied to at least the outer surface of the aforesaid leg to press the leg towards the opposite side portion of the groove in the process of which to cause the knurling to anchor deeply in the melted or softened portions of the body of the insulating part.

It should be apparent and well understood that the length of the profile part 10 and of each groove formed therein will correspond to its intended application. The same applies to the thermoinsulating bar.

The zones of the portions of the part of insulating material which are positioned to lie opposite the knurling may be melted or softened during or after the assembly of the metal profile and insulating parts. Preferably the melting and softening is spatially restricted. If the localized zone or zones are melted or softened only after the assembly of the parts and knurling is provided on the inner side of the aforesaid leg, a bias tension applied to the leg to roll it on the melted and softened zones of the insulating part causes the knurling to press deeply inward of and anchor in the softened portion of the insulating part where it is set. The application of a bias tension to the leg for this purpose is preferred.

In any case the melting or softening required can be achieved by the application of thermal energy, in a manner which particularly suits the application, a preferred medium for effecting the melting or softening being herein described.

The heating of the parts to achieve a jointing thereof occurs preferably over a brief space of time and the heating temperature used is in each case in correspondence with the softening point of the material to which the heat is directed to induce the melting or softening thereof. The heating as herein illustrated, by way of example, is achieved by use of resistance welding using contact pressure elements having the form of contact pressure rollers or clamping jaws. Either direct or alternating current may be used for the welding. The current strength in this case is preferably in the range of 20 kA. Per the preferred practice of the present invention the current feed is in the millisecond range and the current is applied for 3 millisecond intervals with interruptions the time interval of which is 5 milliseconds. The process is preferably continuous with a feed of up to about 50 m/min.

An apparatus for the execution of the process of the invention preferably includes contact-pressure rollers of electrolyte copper. Depending on how many legs bounding a groove or grooves are to be simultaneously pressed into engagement with a profile bar, the contact-pressure rollers can be formed in three layers including a layer of electrolyte copper, a layer of insulating material and a layer of high quality steel.

Broadly, the invention provides a method of producing a connection between a metal part having means defining at least one longitudinal extending groove at one face thereof, wherein said groove has opposed laterally spaced side surfaces at least a portion of which is defined by the inner surface of a projection from said one face of said metal part, and a second part of relatively firm, hard material which is susceptible to softening on application of heat, a portion of which is to be installed in said groove between said opposed side surfaces, comprising providing knurling on the inner side of said projection which forms one of said opposed side surfaces, inserting a portion of said second part in said groove, between said opposed side surfaces thereof, and applying heat to a portion of said second part disposing within said groove to induce material thereof to flow about and into spaces between said knurling and to move in between and over raised projected portions thereof and thereby provide for a firm and stable connection of said parts having substantial strength in shear.

The invention further provides an improved composite profile comprising at least two longitudinally extending profile parts of metal joined by at least one thermoinsulating part, the profile parts of metal having longitudinally extending grooves and being positioned to have said grooves in an opposed, spaced relation and the thermoinsulating part having edge portions thereof respectively anchored in said grooves of said metal parts, a part of the side wall portions of said grooves being selectively distinguished by knurling and the raised and projected portions of the knurling being held captive by a portion of the thermoinsulating part being molded thereover and thereabout.

A primary object of the invention is to provide improvements in means for and a method of construction of a composite profile particularly useful in the construction industry which are economical, most satisfactory and efficient in use and adaptable to a wide variety of applications.

Another object is to provide an improved method for achieving a solid and stable joint between a profile bar, strip or plate of thermoplastic and a metal profile part or metal profile parts as needs required, especially for use in the fabrication of frames for insulating windows and sashes and door frames.

Another object is to provide an improved composite profile affording a solid and stable joint between a profile bar, strip or plate of thermoplastic or the like and a metal profile part or metal profile parts as needs require.

An additional object is to provide an improved means for and a method of achieving a solid and stable joint between a profile bar, strip or plate of thermoplastic and metal profile parts wherein the metal parts are provided with longitudinally extending grooves and the profile bar, strip or plate has respective edge portions thereof anchored in said grooves by means including knurling on a portion of the walls of the grooves and material of said profile bar, strip or plate capping the raised and projected portions of the knurling and lodging in spaces provided between such knurling.

Another object is to provide means for and a method of achieving a solid joint between a profile bar, strip or plate of thermoplastic and a metal profile part or metal profile parts possessing the advantageous features and the means and mode of use and/or application thereof such as herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, of their equivalents.

Figure 2:
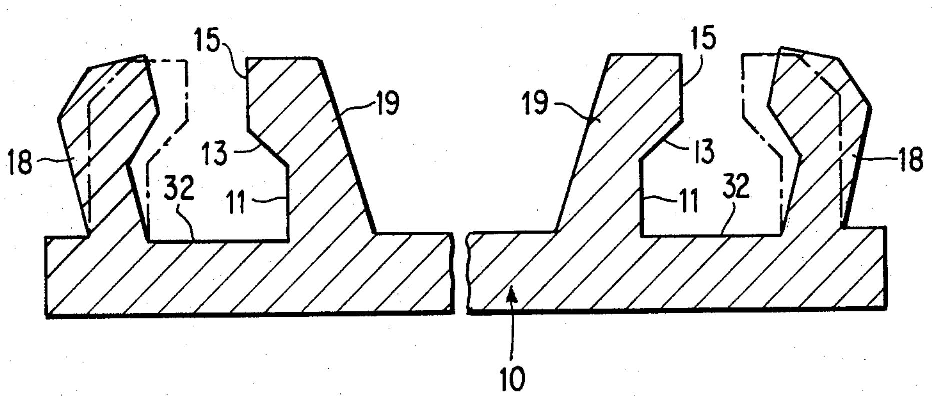
Figure 3:
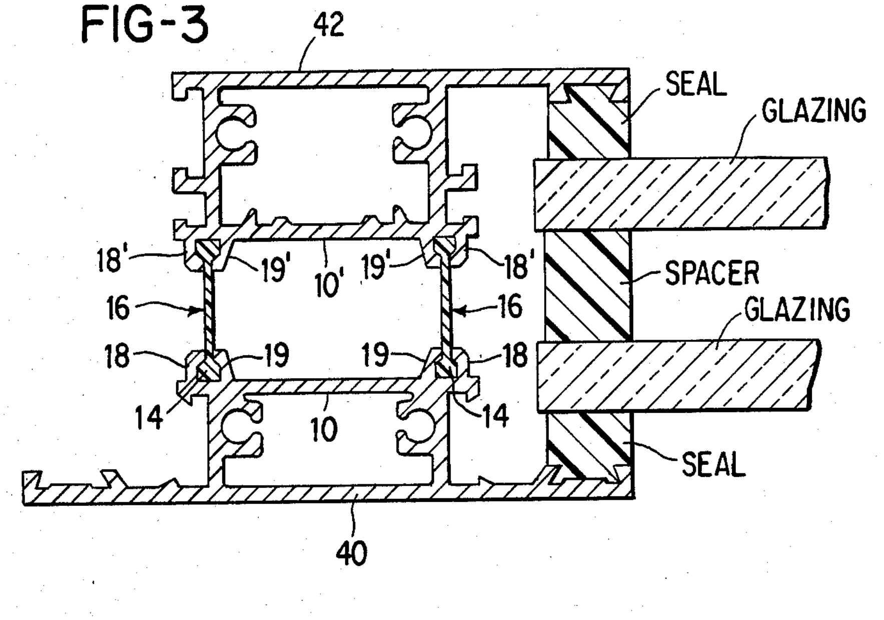

Referring to the drawings wherein one but not the only form of embodiment and use of the invention is illustrated, FIG. 1 is a schematic view in cross section and a fragmentary showing of a solid joint achieved between a metal profile part and a profile part of thermoplastic material, illustrating at the same time means for and a method of achieving said joint;

FIG. 2 is a fragmentary view, in cross section, of a profile part of metal such as included in FIG. 1 illustrating further the means for and method of achieving the joint shown in FIG. 1; and FIG. 3 is a cross section exhibiting, schematically, the result of an application of the means and method of the invention in providing a frame for a window embodying an insulating thermopane window assembly.

FIG. 1 of the drawings illustrates, in cross-section, a part of a composite profile and a joint of its parts derived from the use of the construction and the method of the present invention. The composite profile, to the extent shown in FIG. 1, includes a metal profile part 10 having a plate form constructed to provide means defining a groove 12 at one face thereof. The bounding wall surfaces of the groove 12 in this exemplary device are defined by the adjacent opposite surfaces, comprised of portions 11, 13 and 15, of two legs 19 and 18 which are integral with and project outwardly from said one face of the part 10, generally perpendicular thereto and in a laterally spaced relation. The base surface 32 of the groove is slightly recessed from and parallel to said one face of the part 10. At the same time the inner side surface portions 11 of the legs 19, 18 rise upwardly from and perpendicular to the base in a relatively widely spaced parallel relation, the spacing being greater than that provided between the remainder of the opposed portions of the side walls of the groove. The side wall portions 13 converge upwardly from the upper limit of the portions 11 and from their laterally spaced convergent extremities the outermost portions of the opposed bounding side wall surfaces of the groove 12 are in a parallel relatively closely spaced relation.

It should be understood that the metal part 10 and the groove 12 therein extend longitudinally and by way of example the showing thereof in this case is as referenced to the application of the invention to form a frame for a window structure of a thermopane or insulating window unit. FIG. 3 of the drawings exhibits a cross section of such a window frame embodying and utilizing the invention demonstrated in FIG. 1.

As seen, FIG. 3 presents a horizontal cross section of what is obviously a vertical side portion of the frame of a window unit. It shows the frame as comprising an outer profile part 42 and an inner profile part 40, both of aluminum. The parts 42 and 40 are in an essentially spaced parallel relation. The most adjacent plate portions 10,10' of the parts 42 and 40 are correspondingly parallel and relatively spaced by what may be considered a plate, bar or strip 16 of a relative hard, rigid thermoplastic insulating sheet material. Note that respectively opposite edge portions of the insulating type thermosplastic are respectively lodged and anchored in respectively opposite grooves provided by means in connection with the plate portions 10, 10' adjacent each of their lateral extremities. The details of the forming of the grooves and the means and manner of the application thereto of the thermoplastic, bridging, insulating parts 16 are shown and described with reference to the showing of FIG. 1.

Further shown in FIG. 3 is the manner of achieving the interconnection of glazing to the frame, including in the process a representation of the required spacer and necessary seals. As will be obvious the specific details of the frame other than here indicated are not described since in and of themselves they are unnecessary and not essential to the understanding of the present invention.

Referring once more to FIG. 1, the profile bar, strip or plate 16 which is there shown has one side edge portion 14 enlarged and shaped in cross section to be complementary to the shape, in cross section, of the groove 12. As seen the portion 14 has been inserted and securely lodged in the groove 12.

Note that the side portion of the plate 16 opposite that illustrated in FIG. 1 will be similarly configured in cross section so that it may be similarly anchored in connection with a second metal profile part 10 parallel to the first. This will afford a most effective joinder of the part 16 in bridging relation to parallel relatively spaced metal profile parts 10, the same being exemplified in the arrangement shown in FIG. 3 of the drawings. As seen from this figure, plural insulating parts 16 may likewise be jointed to and serve as insulating spacers between metal profile plates.

Attention is directed to the fact that in the first instance the leg 18 to the outer side of the groove 12, adjacent one side edge of the plate 10, will be bent to angle outward from the leg 19, so that the insertion of the edge portion 14 may be facilitated. Note that the arrangement provided makes the cross-section of the groove 12 slightly larger than that of the edge portion. This enables that the profile element 16 can align itself, as required, in the process of moving the leg 18 to its fully set position, shown in FIG. 1. It further enables that the element 16 can move to the optimum position so the total of the composite profile will be within tolerances.

The initial position of the leg or legs 18 in connection with the profile part 10 is shown, schematically, in FIG. 2 of the drawings.

The leg 18, in any case, is provided with knurling 20 on its side surface which forms one side wall of the groove, in this instance on the portion 15 thereof. This knurling is applied to extend transversely of the longitudinal axis of the composite profile. Likewise it is possible to form a knurling 34 on the base 32 of the groove 12. Such is included in the showing in FIG. 1.

As noted previously, the element 16 is formed of a relatively hard plastic, preferably a thermoplastic synthetic material. In accordance with the preferred practice of the present invention, pressure and heat is applied to the leg 18 in the course of the required movement thereof to its final set position shown in FIG. 1. In the practice of this method, with reference to FIG. 1, it is preferable to use a contact-pressure roll or roller 22. Normally the roller 22 is used in pairs, in which event there will be an oppositely disposed counterpart with reference to that shown schematically in FIG. 1. An arrangement where the rollers 22 would be used in opposed relation is demonstrated in FIG. 2 and also evident from the finished product of FIG. 3.

In the case illustrated the roller 22 is composed of three layers of material. A first layer 24, through which current is conducted, consists of electrolyte copper. A second layer 26 of high-quality steel is separated from the layer 24 by a third layer of insulating material 28. Note that the axis of rotation of the roller 22 is marked as 30.

The outer peripheral edge of the layer 24 of the roller 22 is formed to be complementary to that of the outermost end portion of the outer side surface of the leg 18, as seen in FIG. 1. As should be obvious, and by suitable means, the outer peripheral surface of the layer 24 is brought into contact with the outer end portion of the outer side of the leg 18 and pressure is applied therethrough to the leg portion 18 to swing it up and over from its outwardly inclined position to its set position shown in FIG. 1. At the same time that pressure is applied, current, either direct or alternating, is also applied through the contacting layer 24. The current is preferably about 20 kA and preferably applied, to the roll or roller 22, for intervals of about 3 msec. in duration and intermediate successive application of current there is an interruption of about 5 msec.

By this process of application of the roller 22 and the current therethrough the upper portion of leg 18 is heated and heat transmitted therethrough as it is pressed on the thermoplastic or insulating part or profile 16. The application of heat is such and of such a level as to soften and melt the material of the portion of the part 16 in the groove 12 in the zone of the knurling 20. The amount and the duration of the current depends essentially on the softening point of the material of the profile bar 16. Simultaneous with this softening the pressure applied to the leg 18 through the roller 22 causes the raised and projected portions of the knurling 20 to be thrust deeply into the portion of the part 16 in its path, in the process of which the softened or melted thermoplastic molds over, about and between the raised and projected portions of the knurling. The thermoplastic is then and thereafter set producing a joint which affords the composite in this area of its connection with great shear strength.

The portion of the part 16 at the base 32 can be likewise heated and an effective joint concluded between the knurling 34 and the part 16 in similar and obvious manner. Also thereby a shaped connection such as previously described is accomplished between the interfit profile parts. The total yields a great shearing strength between the parts.

Note that in all cases the leg 19 is originally stable and remains fixed as to its position, in the example illustrated.

Instead of the contact-pressure rolls correspondingly formed clamping jaws can be used, in which case the pressing-on of the leg or legs 18 at any time can take place in one operation over the entire length of the composite profile or in several brief successive operations through the clamping jaws opening and after relative shifting closing again.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A method of producing a connection between at least one metal part having means defining at least one channel or groove at one surface thereof and a thermoinsulating part having a plate, strip or bar form the material of which is firm and hard but susceptible to a melting or softening thereof on the application thereto of a predetermined level of heat characterized by providing that at least a portion of the wall surfaces bounding said channel or groove includes a plurality of projections directed inwardly thereof in a spaced relation and that side wall surfaces bounding said channel or groove are laterally spaced a distance sufficient to receive therebetween a portion of said thermoinsulating part, inserting said portion of said thermoinsulating part within said channel or groove and between said side surfaces thereof, applying heat to localized relatively spaced surface areas of said portion of said thermoinsulating part the spacing of which corresponds substantially to that of said projections, the temperature of which heat is made sufficiently high to melt or soften said spaced surface areas and establishing relative positions of said melted or softened spaced surface areas of said thermoinsulating part and said projections so that material of said melted or softened spaced surface areas molds about said projections and on setting thereof produces a joint between said parts having a substantial strength.

2. A method of producing a connection between at least one metal part having means defining at least one channel or groove at one surface thereof and a thermoplastic thermoinsulating part having a plate, strip or bar form as set forth in claim 1 characterized in that said projections are formed by knurling of a limited part of the wall surfaces bounding said channel or groove and at least one of said facing side wall surfaces is moved relative the other to produce a pressured introduction of at least part of said projections into said melted or softened portions of said thermoinsulating part to induce melted or softened material thereof to mold and set about the projections accommodated thereby.

3. A method of producing a connection between at least one metal part having means defining at least one channel or groove at one surface thereof and a thermoplastic thermoinsulating part having a plate, strip or bar form the material of which is firm and hard but susceptible to a melting or softening thereof on the application thereto of a predetermined level of heat according to that set forth in claim 1 wherein the heat applied to said localized surface areas of said thermoplastic part is applied by way of said projections.

4. A method of producing a connection between at least one metal part having means defining at least one channel or groove at one surface thereof and a thermoplastic thermoinsulating part having a plate, strip or bar form the material of which is firm and hard but susceptible to a melting or softening thereof on the application thereto of a predetermined level of heat according to that set forth in claim 1 wherein the heat applied to said localized surface areas of said thermoplastic part is applied to relatively spaced points on the surface thereof and the depth and area of the melting or softening of said thermoinsulating part at each said point is limited to preserve its structural integrity and strength.

5. A method of producing a connection between at least one metal part having means defining at least one channel or groove at one surface thereof and a thermoplastic thermoinsulating part having a plate, strip or bar form the material of which is firm and hard but susceptible to a melting or softening thereof on the application thereto of a predetermined level of heat according to that set forth in claim 4 wherein the heat applied to said localized surface areas of said thermoplastic part is applied by way of said projections and in the course of a limited movement of at least one of said side wall surfaces of said groove or channel relative the other.

6. A method of producing a connection between at least one metal part having means defining at least one channel or groove at one surface thereof and a thermoplastic thermoinsulating part having a plate, strip or bar form, the material of which is firm and hard but susceptible to a melting or softening thereof on the application thereto of a predetermined level of heat, as in claim 5, herein said heat is produced by directing current through said projections for an extremely brief period of time.

7. A method of producing a connection between at least one metal part having means defining at least one channel or groove at one surface thereof and a thermoplastic thermoinsulating part having a plate, strip or bar form, the material of which is firm and hard but susceptible to a melting or softening thereof on the application thereto of a predetermined level of heat, as in claim 6, wherein said portion of said thermoinsulating part is a side edge portion thereof which extends lengthwise of said channel or groove and between said side surfaces thereof, said heat is produced by directing current through said projections and intermittently through each of a series of said projections at successive locations along the length of said channel or groove and in each case for an extremely brief period of time.

8. A process according to claim 7 wherein said current is applied in brief intervals separated by interruptions for a period of time in the millisecond range.

9. A process as in claim 8 wherein the current is applied for 3 msec. intervals separated by interruptions of 5 msec.

10. A method of producing a connection between at least once metal part having means defining at least once channel or groove at one surface thereof and a thermoplastic thermoinsulating part having a plate, strip or bar form, the material of which is firm and hard but susceptible to a melting or softening thereof on the application thereto of a predetermined level of heat, as in claim 1, wherein said projections are formed on limited portions of the wall surfaces bounding said channel or groove and at least one of said facing side wall surfaces is moved relative the other to produce a pressured introduction of at least part of said projections into said melted or softened portions of said thermoinsulating part to induce melted or softened material thereof to mold and set about the projections accommodated thereby.

11. A proces of producing a composite profile of at least two metal profile parts joined by at least one thermoinsulating profile part of bar, strip or plate form the material of which is firm and hard but susceptible to a melting or softening thereof on the application thereto of a predetermined level of heat, wherein means define at least one longitudinally extending groove or channel at each of facing surfaces of said metal profile parts and spaced portions of part of the surfaces bounding each said groove or channel are provided with projections therefrom directed inwardly of the groove or channel which they bound characterized in that remote edge portions of said thermoinsulating part are respectively disposed in said grooves or channels to have spaced portions on one or more surfaces thereof opposite said projections, applying heat to each of said spaced portions of said surfaces opposite said projections the temperature of which heat is made sufficiently high to melt or soften said opposite surface portions and establishing relative positions of said melted or softened spaced surface areas of said thermoinsulating part and said projections so that material of said melted or softened spaced surface areas molds about said projections and on setting thereof produces a joint between said parts having a substantial strength.

12. A process of producing a composite profile of at least two metal profile parts joined by at least one thermoinsulating profile part of bar, strip or plate form the material of which is firm and hard but susceptible to a melting or softening thereof on the application thereto of a predetermined level of heat, as in claim 11, wherein said heat is applied by way of said projections which in the course of said heating are moved inwardly of said respectively opposite surface portions of said thermoinsulating part as said melting or softening occurs and in the course of such the melted or softened material molds thereabout and thereto.

13. A process of producing a composite profile of at least two metal profile parts joined by at least one thermoinsulating profile part of bar, strip or plate form the material of which is firm and hard but susceptible to a melting or softening thereof on the application thereto of a predetermined level of heat, as in claim 12, wherein the heat applied and the movement of said projections is so limited and localized that the depth and area of the melting or softening of said thermoinsulating part by each said projection is limited to preserve structural integrity and strength of said thermoinsulating part.

* * * * *